United States Patent [19]

Holz

[11] Patent Number: 4,787,500

[45] Date of Patent: Nov. 29, 1988

[54] CONVEYOR BELT SCRAPER

[76] Inventor: William G. Holz, 105 S. Washington St., Lodi, Calif. 95240

[21] Appl. No.: 910,387

[22] Filed: Sep. 22, 1986

[51] Int. Cl.$^4$ ............................................. B65G 45/00
[52] U.S. Cl. ..................................... 198/497; 15/256.5
[58] Field of Search ............................... 198/497–499; 15/256.5, 256.51–256.53, 256.6

[56] References Cited

U.S. PATENT DOCUMENTS

| | | | |
|---|---|---|---|
| 3,362,525 | 1/1968 | Fehr | 198/497 |
| 3,414,116 | 12/1968 | Oury | 198/497 |
| 3,789,682 | 2/1974 | Holz. | |
| 3,875,613 | 4/1975 | Pincus | 198/497 X |
| 3,999,649 | 12/1976 | Andersson | 198/499 |
| 4,202,437 | 5/1980 | Gordon | 198/497 |
| 4,344,525 | 8/1982 | Bancroft et al. | 198/499 |

FOREIGN PATENT DOCUMENTS 2261661  6/1974  Fed. Rep. of Germany ...... 198/497

OTHER PUBLICATIONS

Martin Conveyor Products *Conveyor Products*, Identified as Form No. 3117-1-86LP (pp. 2, 3, 5 and 7) ©1985.

Conveyor Components Co., *Conveyor Components*, Catalog No. C-211 (pp. 6 & 7) ©1970, 1975 and 1977.

Martin Conveyor Products *Durt Hawg*, of the Martin Engineering Co. Identified as Form No. 3142-785LP ©1984.

Primary Examiner—Robert J. Spar
Assistant Examiner—Lyle K. Kimms
Attorney, Agent, or Firm—Glen R. Grunewald; Thomas R. Lampe

[57] ABSTRACT

A belt scraper assembly for cleaning material from a conveyor belt (2). The scraper assembly (1) includes scraper elements (6) that are slidably secured to a mounting plate (7). An element may be replaced, without stopping the conveyor or the cleaning action, by inserting a new element (6) while pushing an old one out. The scraper element has a curved shape such that the belt continually sharpens the scraping edge (22) as it travels, rather than rounding it.

5 Claims, 2 Drawing Sheets

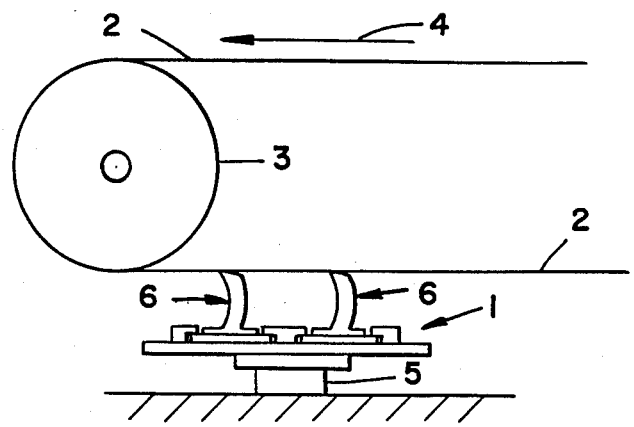
FIG_1
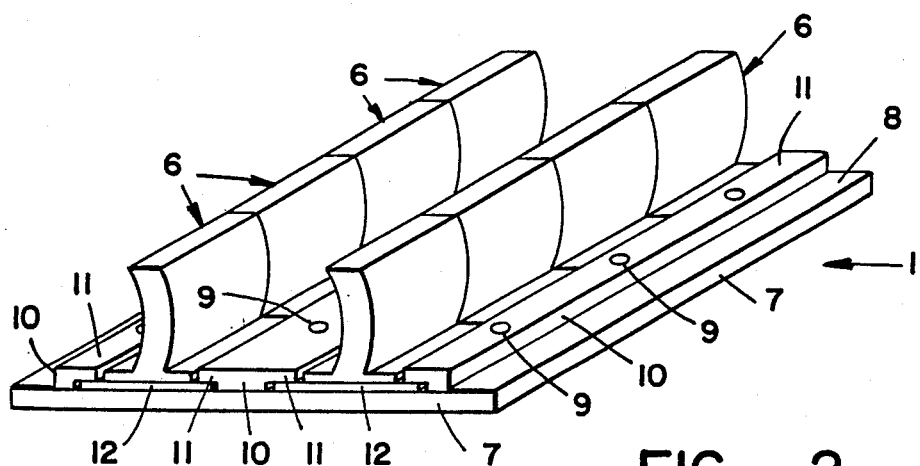
FIG_2
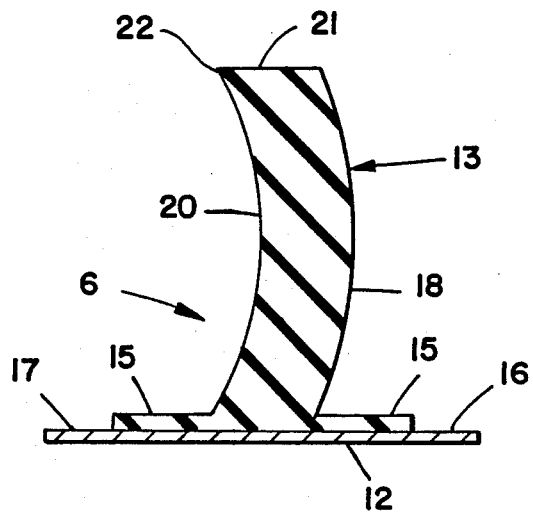
FIG_3

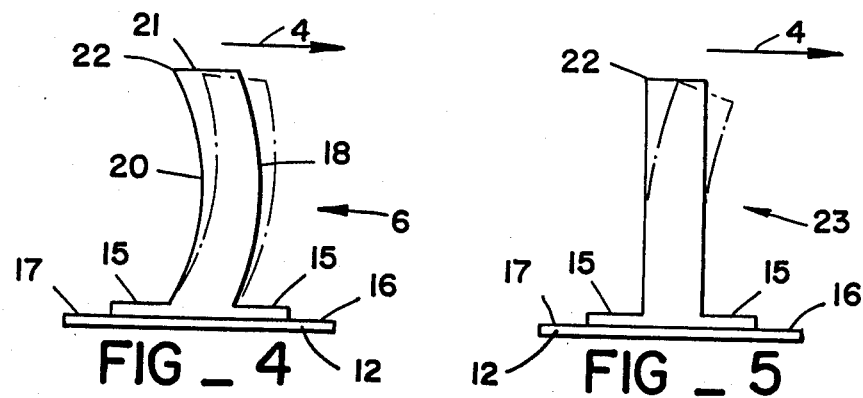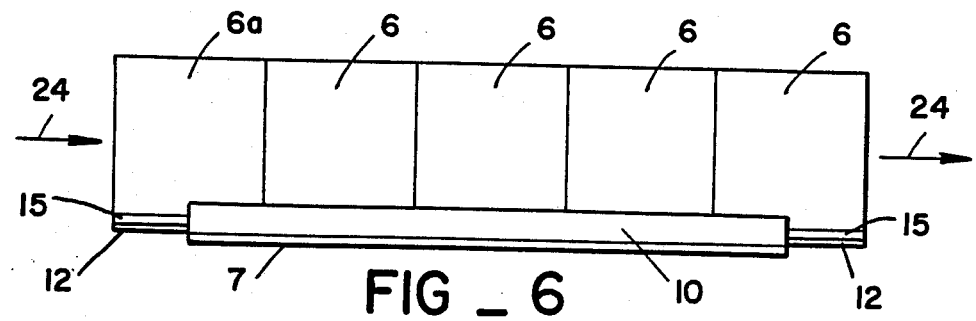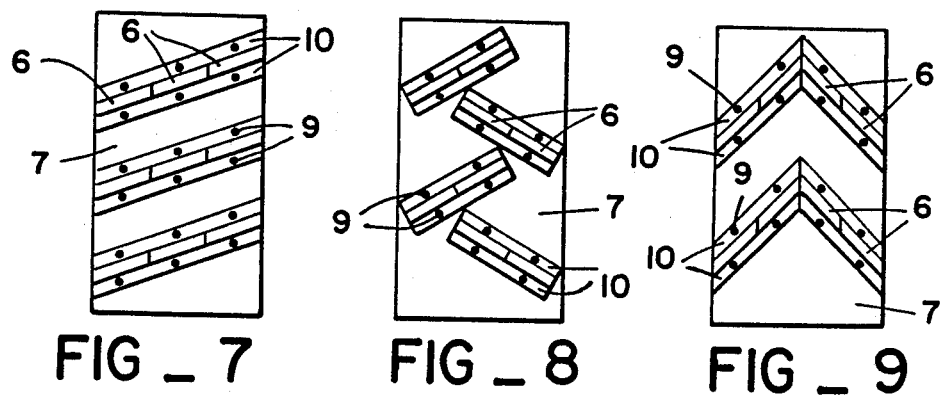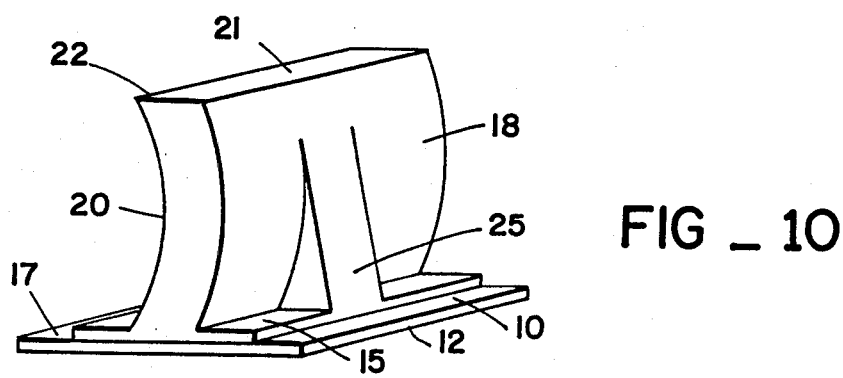

CONVEYOR BELT SCRAPER

TECHNICAL FIELD

This invention is in the field of scrapers for cleaning material from conveyor belts.

BACKGROUND ART

Conveyor belts are used to carry many kinds of materials, ranging from packages to sand and gravel to wet, sticky material that adheres to the belt. If the belt must be stopped for maintenance or replacement, valuable time is lost. Preventing wear of these belts is therefore important.

One way of keeping a belt well maintained is by keeping it clean. Particles can abrade the belt surface or fall into other equipment. If dirt is removed regularly, these problems are lessened.

Often, belt cleaning devices are mounted to clean the belt continuously as it moves. Continuous belt cleaning is important to remove wet, sticky material which does not fall off by itself.

One way belts are cleaned is by mounting motorized roller brushes just below the head pulley around which the belt runs. An example of a brush cleaner is shown at page 7 in the pamphlet of Martin Conveyor Products identified as Form No. 3117-1-86LP. These brushes periodically wear out and need replacement, during which time the conveyor belt must be stopped. Also, the brushes are run by a motor, another component that requires maintenance or may fail.

Another device for cleaning a smooth belt is a series of small rollers which force the belt around slight bends. See, for example, the Conveyor Components Co. Catalog No. C-211 at pages 6 and 7. This bending causes dirt to flake or fall off. These rollers are not effective for all types of material, such as sticky materials which do not fall off easily by themselves.

Another type of cleaner consists of scrapers that are used for removing material, especially sticky material, from a conveyor belt. One type of scraper, called a doctor blade, acts as a knife to cut material off and is mounted to bear against the belt where it wraps around the head pulley. See the above cited Martin Conveyor Products pamphlet at pages 3 and 4. Other scrapers, that act like squeegees, are mounted beneath the belt just after it passes the head pulley. See the Martin Conveyor Products pamphlet at pages 2, 3, and 5, and the pamphlet called *Durt Hawg* of the Martin Engineering Company, identified as Form No. 3142-785LP. These scrapers are rectangular in cross-section and lean in the direction of the belt's travel.

On both the doctor blade and squeegee types, the scraping edge wears to a rounded shape, tending to let grit pass between the belt and the scraper, which promotes belt wear. When such scrapers wear out, the conveyor must be stopped to replace them. They are often awkward to reach, especially if mounted beneath the belt and pulley.

In the field of conveyor belts generally, it is known to cover the pulley face with lagging. As disclosed in U.S. Pat. No. 3,789,682, one form of lagging is in segments which are held to the pulley by being slid beneath flange-like elements face attached to the face of the pulley. The lagging segments can be replaced without removing the pulley and even without removing the belt from the pulley by replacing segments one at a time when they are positioned out of contact with the belt. As disclosed in the patent, the lagging segments are formed by bonding elastomer to a metal base plate and the metal base plate is held to the pulley face.

DISCLOSURE OF THE INVENTION

This invention is a belt scraper that can be easily replaced and, in a preferred embodiment, it can be replaced without shutting down the conveyor belt and without interrupting the belt cleaning function. In another preferred embodiment, the belt scraper has a shape that sharpens the scraping edge as it wears.

The scraper is comprised of a mounting plate having any number of scraper elements secured to it. A biasing means may be used to urge the mounting plate, and therefore the scraper elements, into contact with the belt with appropriate force.

Each scraper element has a metal base plate and an elastomeric portion extending generally perpendicularly from the base plate and bonded to the base plate by known techniques. The base plate protrudes beyond the elastomeric portion to provide flanges. The scraper elements may be made in indefinite lengths and cut to fit mounting plates of any width.

The elastomeric portion preferably has a curved cross-section which allows it to bend into the belt (against the direction of travel), cutting the material off of the belt like a knife. Unlike the prior art doctor blade described above, the belt primarily wears away the top surface of the scraper element, leaving the scraping edge intact and sharp. In the prior art blades, the belt wears directly on the edge, rounding it and allowing abrasives to pass beneath.

For cleaning wide conveyor belts two or more scraper elements can be aligned in a row so that their scraping edges form one long scraping edge. The mounting plate has holding portions spaced from the mounting plate to slidably receive the flanges of the base plate. A scraper element is secured to the mounting plate by sliding the flanges of the base plate under the holding portions on the mounting plate. The holding portions are formed on attachment strips which are secured by screws or other means to the mounting plate.

It is frequently desirable to have scrapers bear against the belt where the belt passes around the head pulley. Since head pulleys are frequently crowned, material near the edges of a belt running over a head pulley is not removed by a scraper bearing against the pulley because the crown of the pulley holds the scraper blade above the edges of the belt. The scraper of this invention may include slits running perpendicularly from the base plate through the scraping surface of the elastomer element so that the elastomer portion of the scraper element is divided into closely adjacent segments. With such a slitted construction each elastomer segment can closely contact the belt surface without being influenced by adjacent segments bearing against the belt at different positions along the crowned surface.

A worn scraper element may be replaced with a new scraper element by sliding the flanges of the worn element out from beneath the holding portions of the mounting plate and sliding a new scraper element beneath the holding portions to replace the worn one. In a preferred embodiment of the invention the holding portions are open at two edges of the mounting plate so that the insertion of a replacement scraper element acts to push out a worn scraper element whereby scraper elements can be replaced without stopping the belt and without interrupting the belt-cleaning function.

BRIEF DESCRIPTION OF THE DRAWINGS

FIG. 1 is an elevation view of a belt scraper embodying the invention in position below a belt.

FIG. 2 is a perspective view of the belt scraper illustrated in FIG. 1.

FIG. 3 is a cross-sectional view of a single scraper element.

FIG. 4 is an end view of a single scraper element.

FIG. 5 is an end view of a different scraper element.

FIG. 6 illustrates an embodiment of the invention where scraper elements are replaced without interrupting the belt cleaning function.

FIG. 7 is a plan view showing the scraper elements mounted in a diagonal configuration.

FIG. 8 is a plan view showing the scraper elements mounted in a different diagonal configuration.

FIG. 9 is a plan view showing the scraper elements mounted in a plow-shaped configuration.

FIG. 10 shows a scraper element with a buttressing rib.

BEST MODE FOR CARRYING OUT THE INVENTION

FIG. 1 shows a belt scraper assembly embodying the invention generally designated 1 in position beneath a belt 2 traveling in the direction of the arrow 4. The belt scraper assembly is positioned to clean the belt just after the belt passes around the head pulley 3. A biasing means 5 is shown beneath the scraper assembly to urge the assembly the belt.

The scraper assembly is shown in detail in FIG. 2. The scraper assembly shown in FIG. 2 is comprised of two rows of scraper elements 6, each row having four scraper elements. As many elements as necessary can be placed in a row to accommodate belts of any width. As many rows as desired can be used.

The scraper elements 6 are mounted on a mounting plate 7. This plate has a top surface 8 on which attachment strips 10 are secured by screws 9 or other means. These attachment strips 10 extend parallel to each other and are spaced to hold the elements flanges 16 and 17 (FIG. 3) of the scraper beneath their holding portions 11. A row of scraper elements 6 is mounted beneath holding portions 11 and runs parallel to the attachment strips. The scraper elements held under the holding portions 11 are secured to the mounting plate.

FIG. 3 shows a single scraper element 6. It is comprised of a base plate 12 and an elastomeric portion generally designated 13 extending from the base plate 12. The elastomeric portion 13 is generally made of polyurethane, although other materials are possible. The scraper element can be made to any length and cut as desired to fit any width of belt.

The elastomeric portion 13 has a wide base 15, which provides more bonding area between the elastomeric portion 13 and base plate 12. The base plate has flanges 16, 17 protruding beyond the elastomeric portion's wide base. These flanges slide under the holding portions 11 of the attachment strips 10 to secure the scraper element 6 to the mounting plate 7.

The elastomeric portion 13 had a convex face 18 and a concave face 20. These faces give the scraping member its curved shape. The scraping member has a top face 21 which joins the concave face 20 to form a scraping edge 22.

When belt 2 passes over the elastomeric portion 13, the elastomeric portion bends as shown by the dotted lines in FIG. 4. The scraping edge 22 always presents a narrow angle of material and the belt 2 passes generally over and almost parallel to the top surface 21, so the edge is kept sharp.

A scraper 23 having a conventional rectangular cross-section is shown in FIG. 5. The dotted lines show how it bends under the belt and how the belt rounds off the scraping edge, so that this scraper acts as a squeegee rather than a cutter. The element shown in FIG. 5 is useful if the material from belt 2 does not contain abrasive particles.

Scraper elements of the present invention can be replaced without stopping the belt or stopping the cleaning action. FIG. 6 shows a belt cleaner normally using four scraper elements 6 in abutting relationship. In three scraper element 6a is being inserted into the FIG. 6 a new row of elements. As element 6a is inserted an old element 6 on the other end is pushed out of the mounting plate from beneath holding portions 11 in the of arrow 24. This procedure can be done from direction the side of the conveyor, so there is no need to reach into awkward places beneath the belt to change scraper elements. If force is needed to get an element out, a hammer to drive the elements through or a mechanical puller with a suitable clamp can be used.

The scraping elements 6 can also be aligned in diagonal rows, as in FIG. 7 or 8, or in a plow shape, as in FIG. 9. The elements in the configurations of FIGS. 8 and 9 can be replaced while but the belt cleaning function is the belt is moving but the belt cleaning function is interrupted. However, if multiple rows of elements 6 are used, the belt cleaning function will be accomplished by the second row of scraper elements while the first row is being replaced.

A single scraping element 6 may also have one or more strengthening or buttressing ribs 25 as shown in FIG. 10. This stiffens the element and keeps the top face 21 more closely parallel with the belt 2. Depending on the material used and the dimensions of the scraper elements, a single, continuous buttressed cross-sectional shape may be used.

INDUSTRIAL APPLICABILITY

The belt scraper of this invention is used to remove material from a conveyor belt as it moves. The belt scraper of this invention is used by mounting scraper elements in the mounting plate which in turn is positioned at an appropriate location beneath a conveyor belt. The mounting plate is biased upwardly until the top scraping edges of the scraper elements contact the belt. As the belt moves, material adhering to its surface is scraped off by the belt scraper and falls beneath or to the side of the conveyor. When the scraper elements become worn, new elements are inserted to replace the worn ones, preferably by using the new elements as a ram to force the worn elements from the mounting plate.

What is claimed is:

1. In a conveyor belt scraper for a belt having a direction of travel toward said scraper, the belt scraper having scraping elements urged into contact with the underside of the belt to remove material from the belt, the improvement comprising:
   a mounting plate having a top surface, two spaced, parallel attachment strips fixed to the surface, each attachment strip having a holding portion spaced from the surface with the holding portions facing each other;

a plurality of scraper elements mounted on said mounting plate, each said scraper element having a metal base plate, the base plate dimensioned to slide between the holding portions and the mounting plate; and an elastomeric portion connected to and extending generally perpendicularly from the base plate, said elastomeric portion having a convex face facing the direction of travel of said belt, a concave face in the direction of travel of said belt, and a top face extending between the convex and concave faces, the top face and the concave face meeting at an edge engaging said belt, said elastomeric portion additionally including an integral base widening out from said convex and concave faces and secured to said base plate, said base being disposed between said attachment strip holding portions and said base plate extending beyond said base and between the holding portions and mounting plate, said scraper elements being disposed end to end with elastomeric portions and base plates of adjacent scraper elements in abutting relationship.

2. The belt scraper of claim 1, wherein a buttressing rib extends from the convex face of said elastomeric portion.

3. The belt scraper of claim 1, in which
the mounting plate has an axis parallel to the direction of travel of the belt.
and the scraper element is mounted on the mounting plate so that the edge is at an angle to the axis.

4. The belt scraper of claim 3 having a plurality of scraper elements arranged in parallel rows.

5. The belt scraper of claim 1, in which the mounting plate has an axis parallel to the direction of travel of the belt,
said scraper elements mounted on the mounting plate so that the edges of a first plurality of scraper elements are disposed at one angle to the axis and the edges of another plurality of scraper elements are disposed at another angle to the axis,
the angle of the edges of the first plurality of scraper elements dimensioned to deflect material from the center of the belt toward one edge of the belt,
the angle of the edges of said another plurality of scraper elements dimensioned to deflect material from the center of the belt toward the other edge of the belt.

* * * * *

UNITED STATES PATENT AND TRADEMARK OFFICE
CERTIFICATE OF CORRECTION

PATENT NO. : 4,787,500

DATED : November 29, 1988

INVENTOR(S) : William G. Holz

It is certified that error appears in the above-identified patent and that said Letters Patent is hereby corrected as shown below:

Col. 3, line 33, insert --into contact with-- after "assembly"

Col. 3, lines 44-45, delete [elements] after "hold the" and insert --elements-- after "scraper".

Col. 4, line 12, insert --being removed-- after "material".

Col. 4, lines 17-19, delete [three scraper element 6a is being inserted into the] after "In", delete [row of elements] after "new", and insert --element 6a is being inserted into the row of elements-- after "new"

Col. 4, line 22, delete [direction]

Col. 4, line 21, insert --direction-- after "in the"

Col. 4, line 31, insert --the belt is moving-- after "while"

Col. 4, lines 31-32, delete [is the belt moving but the belt cleaning function].

Signed and Sealed this

Eighteenth Day of April, 1989

Attest:

DONALD J. QUIGG

Attesting Officer

Commissioner of Patents and Trademarks